United States Patent [19]
De Veer

[11] 3,868,168
[45] Feb. 25, 1975

[54] COMBINATION OF BIREFRINGENT ELEMENTS FOR POLARIZING INTERFERENTIAL SYSTEMS

[75] Inventor: Johannes D. De Veer, Harvard, Mass.

[73] Assignee: American Optical Corporation, Southbridge, Mass.

[22] Filed: Jan. 16, 1973

[21] Appl. No.: 324,456

[52] U.S. Cl. .................................................. 350/12
[51] Int. Cl. .......................................... G02b 21/06
[58] Field of Search .................... 350/12, 13, 14, 15

[56] References Cited
UNITED STATES PATENTS
2,924,142    2/1960    Nomarski.............................. 350/13

OTHER PUBLICATIONS
Francon et al., Polarization Interferometers, pp. 31–33, Wiley-Interscience, 1971.

Primary Examiner—Ronald L. Wibert
Assistant Examiner—Conrad Clark
Attorney, Agent, or Firm—Alan H. Spencer; William C. Nealon

[57] ABSTRACT

Polarizing interferential systems having a light source, a compensator element, an object, and a beam splitter element in optical alignment which utilize only a single birefringent wedge in the compensator element and only a single birefringent wedge in the beam splitter element are useful for the study of objects exhibiting light amplitude and/or phase properties. By tilting either the optic axis with respect to the light system, the entire wedge or both, it is possible to eliminate the dual wedge elements of the prior art and have greater versitility in instrument design.

9 Claims, 14 Drawing Figures

COMBINATION OF BIREFRINGENT ELEMENTS FOR POLARIZING INTERFERENTIAL SYSTEMS

BACKGROUND OF THE INVENTION

This invention relates to the observation of objects which affect the phase of light, either transmitted or reflected. More particularly, this invention relates to polarizing interferential systems using the birefringent properties of crystalline materials to provide a means of studying amplitude and phase properties of objects by differential interference and/or interference contrast methods.

U.S. Pat. Nos. 2,601,175 to Smith, and 2,924,142 to Nomarski relate to the study of objects exhibiting a phase effect on transmitted or reflected light. The devices of Smith utilize conventional Wollaston birefringent elements. Nomarski teaches that certain advantages may be obtained by rotating the optic axis of one of the prisms of a Wollaston element. Typical systems disclosed by Smith and Nomarski are diagramtically illustrated in FIGS. 1a and 1b, respectively. These systems are illustrated without suggestion or restriction to other optical elements such as lenses which may be utilized in a manner known to those skilled in the art. Basically, interferential systems for transmitted light include as essential components, a polarizer P, a birefringent compensating element C, a transparent or translucent object O, which is capable of affecting the transmission of light in accordance with its phase, a beam splitting element B having birefringent properties equal and opposite to the birefringent properties of compensator element C and an analyzer A, usually crossed with respect to polarizer P. The compensator element when used in polarizing interferential systems has the principle function of permitting one to use incoherent light rather than having to use a coherent light source. Those skilled in the art are well aware that the birefringent compensating element eliminates the need for coherent sources and that by arranging the optic axis thereof normal to the optic axis of the beam splitter element, the system can be compensated for white light. Nomarski discloses several polarizing interferential systems of the type used in microscopes, see for example FIG. 2. A field stop aperture is normally used in such systems and is generally located before the polarizer. Among the functions of the microscope condenser is to focus the field stop on the object, in order to have the desired illumination. Also, the condenser lens system in combination with the objective lens system must focus the fringes of the birefringent compensator element in the same plane, and in the same direction as the fringes of the birefringent beam splitter element and with the proper magnification. In order to accomplish this with some condenser systems, it is necessary that the fringe plane of the birefringent compensator element be located inside the condenser lens system. Smith and Nomarski utilize the conventional Wollaston arrangement of two birefringent elements each containing a pair of complementary prismatic birefringent wedges as an optically interfacially connected unit having parallel faces and optic axis normal to each other, which wedges have both entrance and exit surfaces normal to the optical axis or center line of the instrument. Polarizing interferential systems of the type just discussed may be used in optical instruments using lens systems between various elements of the polarizing interferential systems. While Nomarski does suggest in passing that it is possible to have an interferential system utilizing single birefringent wedge elements instead of the conventional complementary pair of wedges, commercial instruments have never utilized such an arrangement due to the optical inconvenience caused by the location of the fringe plane within the main beam splitter birefringent element and Nomarski does not teach that the fringe plane can be moved outside such an element.

BRIEF DESCRIPTION OF THE INVENTION AND DRAWINGS

I have discovered that a pair of birefringent elements, each having a sole birefringent wedge being arranged to treat the light equally and oppositely offer substantial simplification without the optical disadvantages heretofore associated with such systems. The plane formed by the locus of points formed by the intersection of the respective ordinary and extraordinary rays formed by a bundle of light rays passed through a birefringent wedge is referred to as a fringe plane. The fringe plane may or may not be parallel to one or more surfaces of a wedge and is frequently located within, on one surface of or very near to a birefringent wedge or an optically, interfacially connected unit of a pair of complementary birefringent wedges. By tilting either the optic axis with respect to the planar surfaces of at least one of the wedges or tilting at least one wedge with respect to the center line or optical axis of the instrument or both, it is possible to move the fringe plane and avoid the known disadvantages associated with such systems. A significant reduction in cost results from the elimination of matching pairs of complementary wedges.

It is most desirable to have the fringe plane of the birefringent beam splitter element located near or coincident with the back focal plane of the objective of a conventional transmitted light microscope. Present day microscopes are usually designed to accommodate a plurality of microscope objectives in order to provide a broad range of magnification from which the user may select. While every objective designed for a given microscope does not have the back focal plane positioned in the identical location, the lens system is designed in order to position the back focal plane in substantially the same location, which almost always lies within the objective lens system. Therefore, there is substantial advantage to moving the fringe plane away from the beam splitter in order that this plane may be as near as practical to the rear focal plane of the objective.

FIGS. 2—10 are diagramatic sectional views of several embodiments of the present invention, arranged for use in optical systems inverting the fringes of the compensator element as imaged on the fringes of the beam splitter element.

Figure 1A:
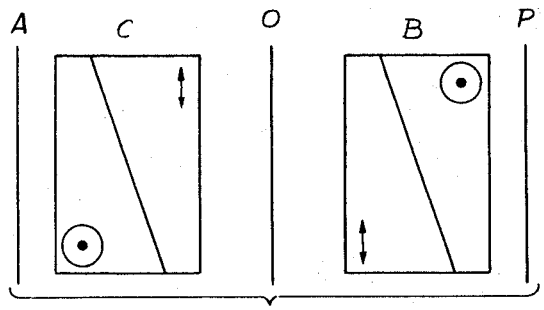
FIG. 1a is a diagramatic sectional view of an interferential system of one type taught by Smith.
Figure 1B:
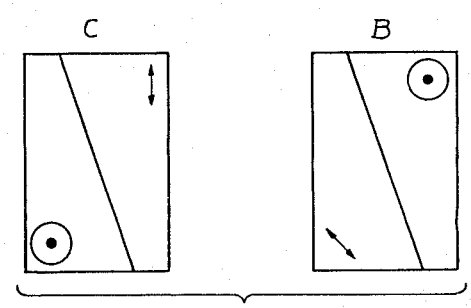
FIG. 1b is a diagramatic sectional view of an interferential system of one type taught by Nomarski.
Figure 2A:
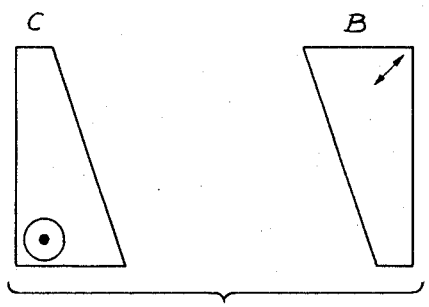
Figure 2B:
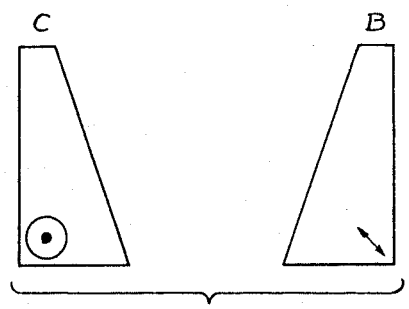

FIG. 2b is a diagramatic sectional view of the embodiment of the present invention arranged in an optical system which does not invert the fringes of the compensator element as imaged on the fringes of the beam splitter element.

Figure 11:
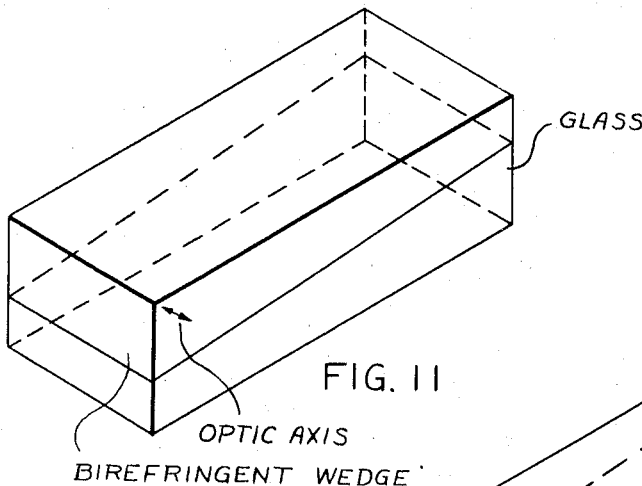
Figure 12:
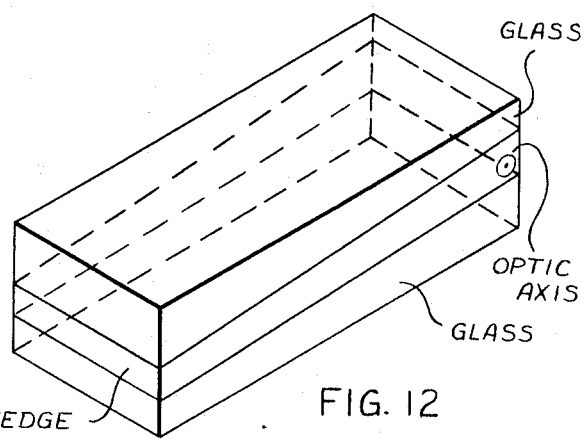

FIGS. 11 and 12 are perspective views of birefringent elements suitable for use in the present invention.

DESCRIPTION OF THE PREFERRED EMBODIMENTS

Figure 3:
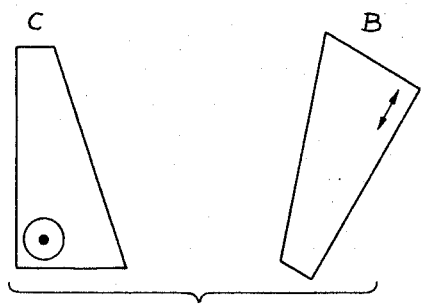
Figure 4:
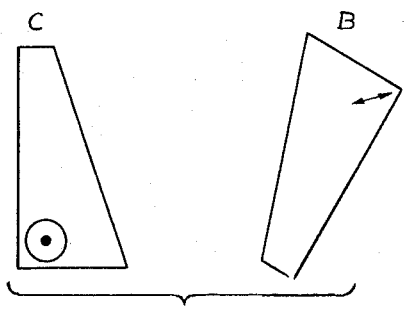
Figure 5:
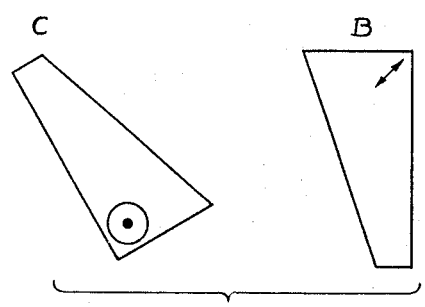
Figure 6:
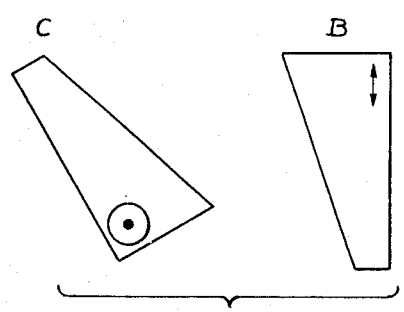
Figure 7:
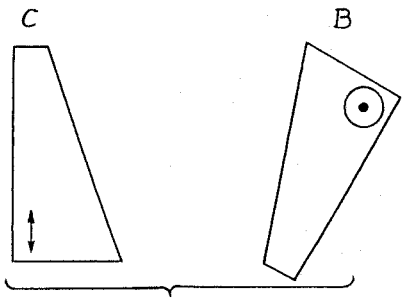
Figure 8:
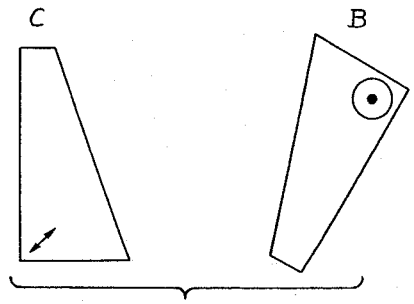
Figure 9:
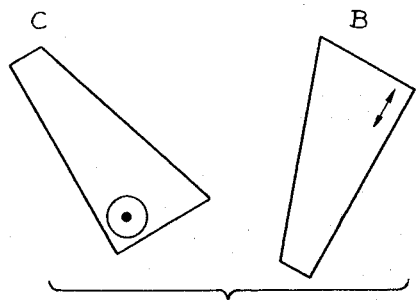
Figure 10:
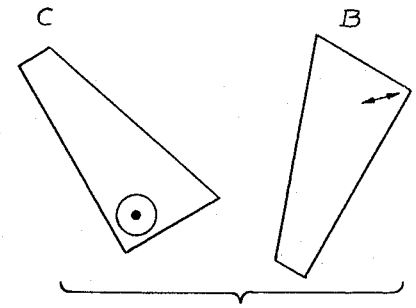

FIGS. 2, 3, and 4 illustrate embodiments of the present invention wherein the sole birefringent wedge of the compensating birefringent element C has an optic axis parallel to the apex of the wedge. In FIG. 2, the fringes are displaced from the birefringent element B by rotating the optic axis, which is perpendicular to the apex, to an angle oblique to both faces of the sole birefringent wedge in the beam splitter element B. In FIG. 3, the fringes are displaced from the beam splitter B by tilting the entire wedge. In FIG. 4, the fringes are displaced from the beam splitter element B by tilting the wedge and rotating the optic axis to an angle oblique to both faces of the wedges. FIG. 2b is similar to FIG. 2a but the system can operate without lenses. The embodiment of FIG. 5 illustrates the present invention in a system having the fringes displaced from both the compensator element C and beam splitter element B. Displacement of the fringes from C is obtained by tilting the wedge while displacement of the fringes from B is obtained by rotating the optic axis of the beam splitter wedge. FIG. 6 illustrates an embodiment of the present invention wherein the fringes are displaced from the compensating element by tilting the wedge. FIGS. 7 and 8 illustrate embodiments of the present invention having a compensator element C with an optic axis perpendicular to the apex of the wedge and a beam splitter element with the optic axis parallel to the apex of the wedge. Displacement of the fringes from the beam splitter element is accomplished by tilting the wedge. FIG. 8 illustrates a system of the present invention where the fringes are also displaced from the compensator element C by rotation of the optic axis with respect to the faces of the wedge. FIGS. 9 and 10 illustrate embodiments of the present invention wherein the wedge of the compensator C and the wedge of the beam splitter B are both tilted with respect to the optical axis of the instrument. The embodiment of FIG. 10 also contains a beam splitter B having the optic axis rotated with respect to the faces of the birefringent wedge.

FIG. 11 illustrates a birefringent element of the type suitable for practicing the present invention having the optic axis perependicular to the apex of the wedge and rotated with respect to the surfaces thereof. To assist in mounting and to obtain directional correction, a wedge is usually combined with a complementary glass wedge which does not have birefringent properties. Such an arrangement provides assistance in maintaining optical alignment through an instrument.

FIG. 12 illustrates a birefringent element suitable for use in systems of the present invention having a birefringent wedge tilted with respect to the optical axis of the instrument and the optic axis of the wedge parallel to the apex of said wedge. In such an arrangement, a pair of glass wedges can be optically interfacially coupled to opposite surfaces of the birefringent wedge. These glass wedges are adapted to provide entrance and exit surfaces normal to the optical axis of the instrument and exhibit no birefringent properties.

The amount of tilt applied to a wedge or the degree of rotation of the optic axis of a wedge may be varied over a wide range depending upon the requirements of the optical instrument in which they are used. The amount of displacement necessary to place the fringe plane in the desired position within the optical instrument is the controlling valve from which the degree of rotation of the optic axis or degree of tilt of the wedge is determined by conventional optical principles. For example, in an interference contrast microscope, the rotation of the optic axis in a beam splitter or compensator element may range from −40° to +40° or even more and the degree of tilt applied to the entire wedge may range from say −30° to +30°. In a differential interference microscope having an embodiment according to the present invention as illustrated in FIG. 5 with a condenser focal length of 10mm, the optic axis of the beam splitter may be rotated about ten degrees from parallel with the wedge surface normal to the optical axis. The compensator element would differ for various objectives and with a 40X objective, the wedge may be tilted about fifteen degrees to place the fringe plane within the condenser system in order to focus the compensator fringes on the beam splitter fringes.

The drawings illustrate principles of the present invention when the beam splitter birefringent element and compensator birefringent element are both made of the same birefringent material. The design of interferential systems is well-known to include the use of different birefringent materials. When two different birefringent materials are used, one in the compensator and one in the beam splitter element, that have a different sign of birefringence, than those skilled in the art are well aware that both elements would have their respective optic axis in the same plane and if the materials have the same sign, the respective optic axis would be normal to each other. While quartz is the most common birefringent material due to its abundance and low cost, other birefringent materials are considered useful in practicing the present invention including sapphire, calcite, magnesium flouride and the like, whose birefringent properties are well-known.

It may occur to others of ordinary skill in the art to make modifications of the present invention which will lie within the concept and scope thereof and will not constitute a departure therefrom. Accordingly, it is intended that the invention be not limited by the details in which it has been described, but that it encompass all within the purview of the following claims.

What is claimed is:

1. In a polarizing interferential system having a light source, a polarizer, a compensator element, an object, a beam splitter element and an analyzer, all in alignment along a center line, the improvement comprising said compensator element being a single birefringent crystalline first wedge having two converging planar surfaces intersecting the center line, said wedge having an optic axis, said beam splitter being a single birefringent crystalline second wedge having two converging planar surfaces intersecting the center line, said second wedge having an optic axis, and said wedges being arranged to have at least three of the combination of said planar surfaces and optic axes oblique to the center line.

2. The improvement of claim 1 wherein both planar surfaces of one wedge are oblique to the center line.

3. The improvement of claim 2 wherein said one wedge is the beam splitter element.

4. The improvement of claim 2 wherein said one wedge is the compensator element.

5. The improvement of claim 1 wherein the optic axis of one wedge is oblique to the center line.

6. The improvement of claim 5 wherein said one wedge is the beam splitter element.

7. The improvement of claim 5 wherein said one wedge is the compensator element.

8. The improvement of claim 1 wherein one wedge has the two planar surfaces oblique to the center line, the optic axis normal thereto, and is the compensator element; the other wedge has one planar surface normal to the center line, the optic axis oblique thereto, and is the beam splitter element; and both said wedges are quartz.

9. The improvement of claim 1 wherein compensator and beam splitter elements, each, further include a nonbirefringent, glass complementary wedge optically interfacially connected to one of said planar surfaces.

* * * * *